US012172459B1

(12) United States Patent
Meng et al.

(10) Patent No.: US 12,172,459 B1
(45) Date of Patent: Dec. 24, 2024

(54) PROCESS FOR PRODUCING AN IDENTIFIABLE HAND TOOL

(71) Applicants: Ji-Fen Meng, Taichung (TW); Kyle Liu, Taichung (TW)

(72) Inventors: Ji-Fen Meng, Taichung (TW); Kyle Liu, Taichung (TW)

(73) Assignee: JEOUTAY LIU INDUSTRIAL CO., LTD. (TW)

(*) Notice: Subject to any disclaimer, the term of this patent is extended or adjusted under 35 U.S.C. 154(b) by 50 days.

(21) Appl. No.: 18/205,559

(22) Filed: Jun. 4, 2023

(51) Int. Cl.
*B44C 1/22* (2006.01)
*B44C 1/00* (2006.01)

(52) U.S. Cl.
CPC .............. *B44C 1/225* (2013.01); *B44C 1/005* (2013.01); *B44C 1/222* (2013.01)

(58) Field of Classification Search
CPC .......... B44C 1/225; B44C 1/005; B44C 1/222
See application file for complete search history.

*Primary Examiner* — Moshe Wilensky

(57) ABSTRACT

A process for producing an identifiable hand tool includes a machining step which uses machining tools to produce a rough part of the hand tool; a setting identification step which forms a identification area with an identification groove on the surface of the rough part; a heat treatment step which proceeds a heat treatment to the rough part; a vibration step which vibrates the rough part; a surface treatment step which electroplates the rough part to form an electroplating layer on the surface of the rough part to form a hand tool with a base color identification layer, and a coloring step which uses a Charged Coupled Device to determine a depth of the identification groove and uses a coloring pen of a coloring machine to perform coloring processing to form an identification portion with a different color from the base color identification layer.

1 Claim, 6 Drawing Sheets

PROCESS FOR PRODUCING AN IDENTIFIABLE HAND TOOL

BACKGROUND OF THE INVENTION

1. Fields of the Invention

The present invention relates to a process for producing an identifiable hand tool, and more particularly, to a process that reduces number of steps and manufacturing cost.

2. Descriptions of Related Art

The hand tools are one of the most commonly used items in any field. However, looking at all types of hand tools, whether it's screwdrivers, wrenches, hammers, sockets, etc., any type of hand tool has different specifications in terms of size, mainly to match the object being used. For example, sockets are designed with socket ends on one side to match screws and nuts of different sizes. Due to the different specifications, the design of the socket not only varies in length or socket size, but also allows users to frequently change hand tools for optimal use.

According to the basic description above, in order to provide users with clear identification of the hand tool to be taken, various markings such as specifications, numbers, codes, etc. are commonly set on the outer surface of the hand tool. This mainly provides users with clear identification of the size or type of hand tool to be taken. However, the common markings on the outer surface of the hand tool are mainly created by post-processing methods, in which the surface is carved after the hand tool is completed, and then dye is filled into the carved part to create a recognizable marking area, thereby achieving an effective identification function.

However, relevant industry personnel have overlooked one thing. The identification part of the outer surface of the hand tool can easily become worn and difficult to identify, or the marking of the hand tool can gradually be eroded due to frequent gripping and sweating of the hands, resulting in the inability to identify the hand tool, among other disadvantages.

As a result, the Taiwanese Patent No. 1504483 provides a process that is used for coloring and vibrating. However, not only is the coloring and vibration process troublesome in terms of processing, the most time-consuming and labor-intensive part is full-time positioning. If the relevant positions cannot be confirmed, other processes cannot achieve the claimed effect. In addition, sockets are curved structures, which make positioning even more complicated. In this invented process, just positioning alone requires enormous costs and working hours. If it is necessary to go through multiple surface treatment steps such as conductive steps and multiple layers of color layers, the cost will be greatly increased, and the process and working hours will be increased too much. Therefore, it does not meet the industry's usability.

The present invention intends to provide a process for producing an identifiable hand tool, to eliminate the shortcomings mentioned above.

SUMMARY OF THE INVENTION

The present invention relates to a process for producing an identifiable hand tool, and comprises a machining step which uses machining tools to produce a rough part of the hand tool; a setting identification step which forms an identification area with an identification groove on the surface of the rough part; a heat treatment step which proceeds a heat treatment to the rough part; a vibration step which vibrates the rough part; a surface treatment step which electroplates the rough part to form an electroplating layer on the surface of the rough part to form a hand tool with a base color identification layer, and a coloring step which uses a Charged Coupled Device to determine a depth of the identification groove and uses a coloring pen of a coloring machine to perform coloring processing to form an identification portion with a different color from the base color identification layer.

The main purpose of this invention is to provide a commonly used hand tool with identifiable features. By utilizing machining, setting identification, heat treatment, vibration, surface treatment, and coloring steps, the invention enables direct coloring of the identification groove on the hand tool, forming an identification portion with a color different from the base color to maintain the best recognition effect. Moreover, the invention has a smooth process without the need for repetitive processing, which can save significant costs and achieve the best industrial practicality.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
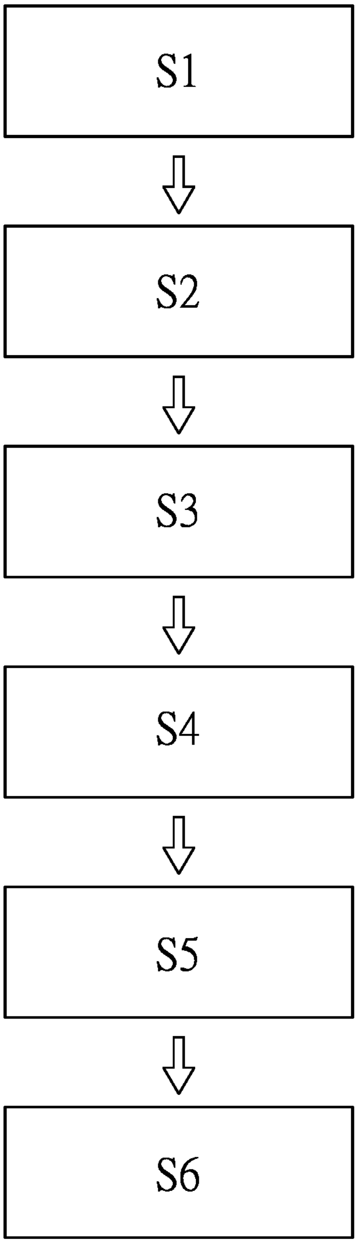
FIG. 1 discloses the steps of the process of the present invention.
Figure 2:
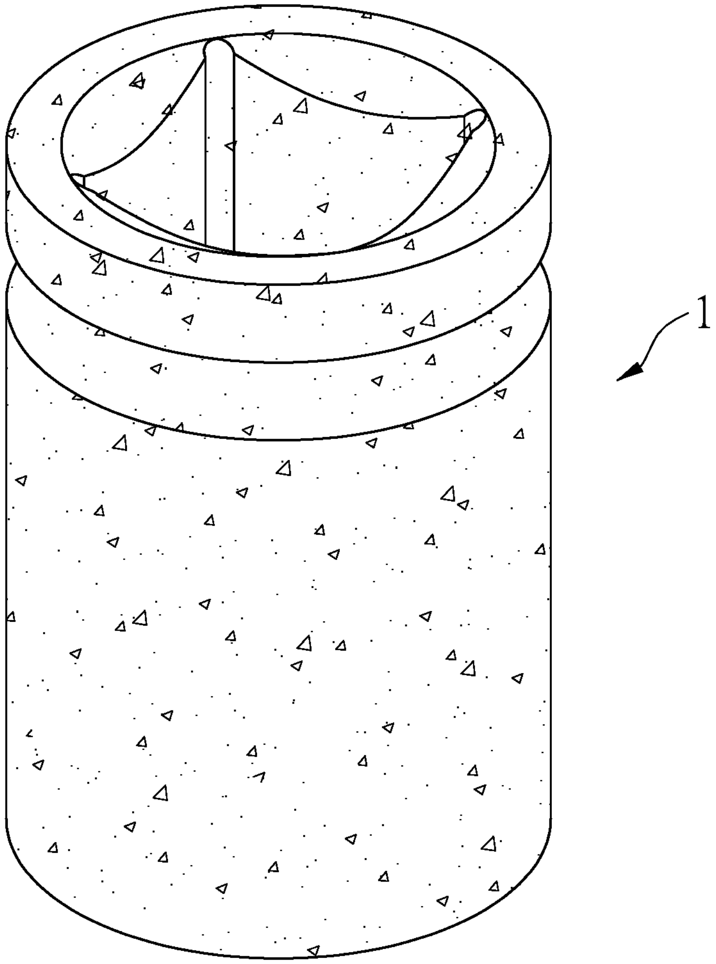
FIG. 2 shows the rough part in the step of machining of the present invention.
Figure 3:
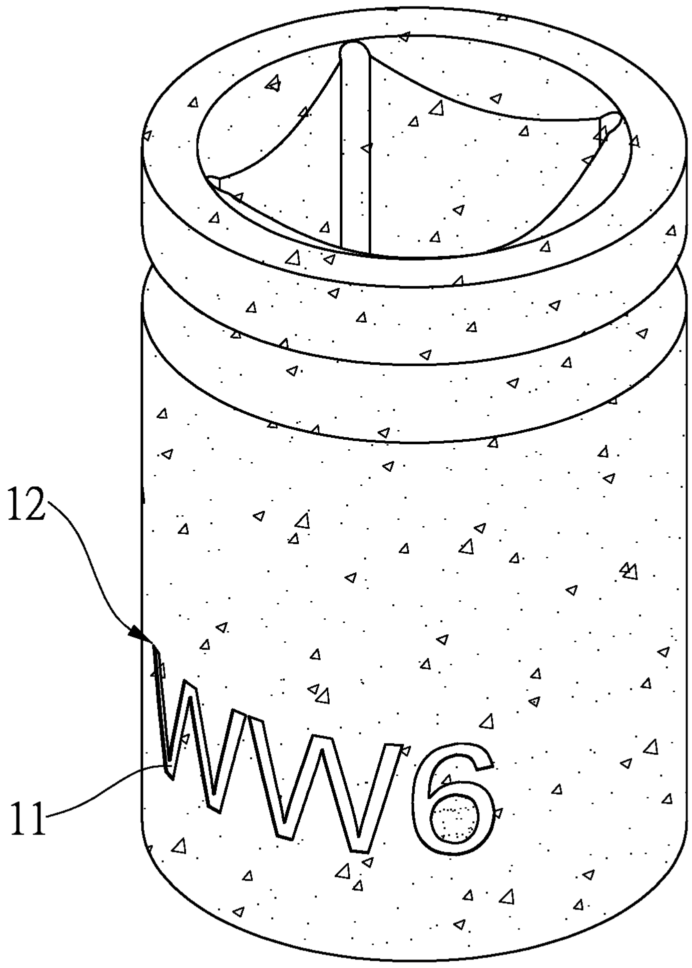
FIG. 3 shows the rough part in the step of vibration of the present invention.
Figure 4:
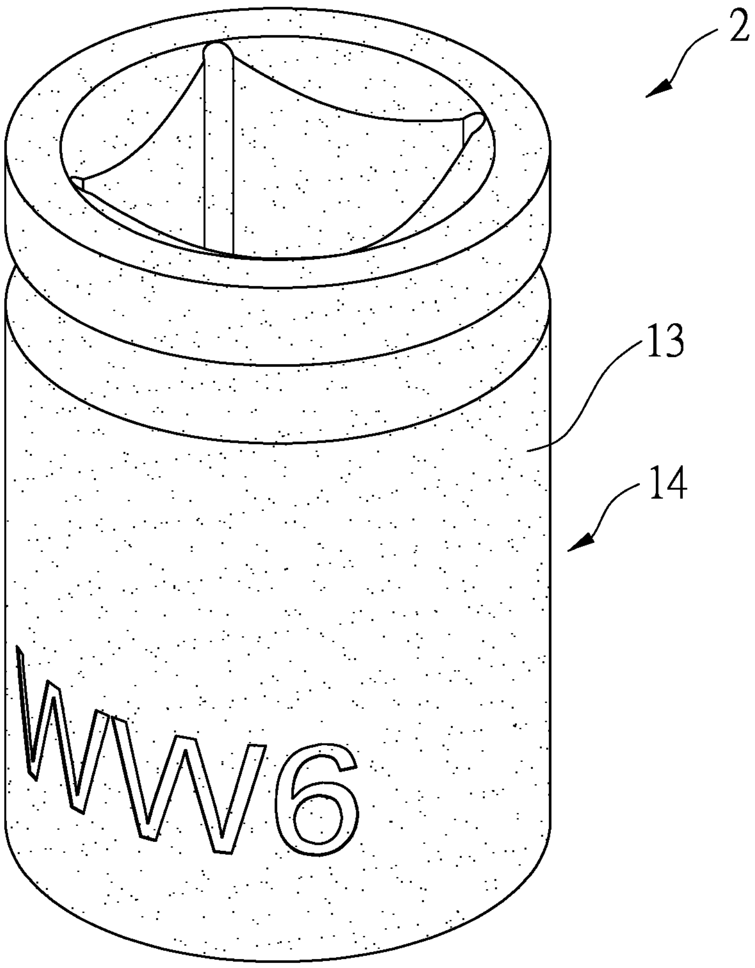
FIG. 4 shows the rough part in the step of surface treatment of the present invention.
Figure 5:
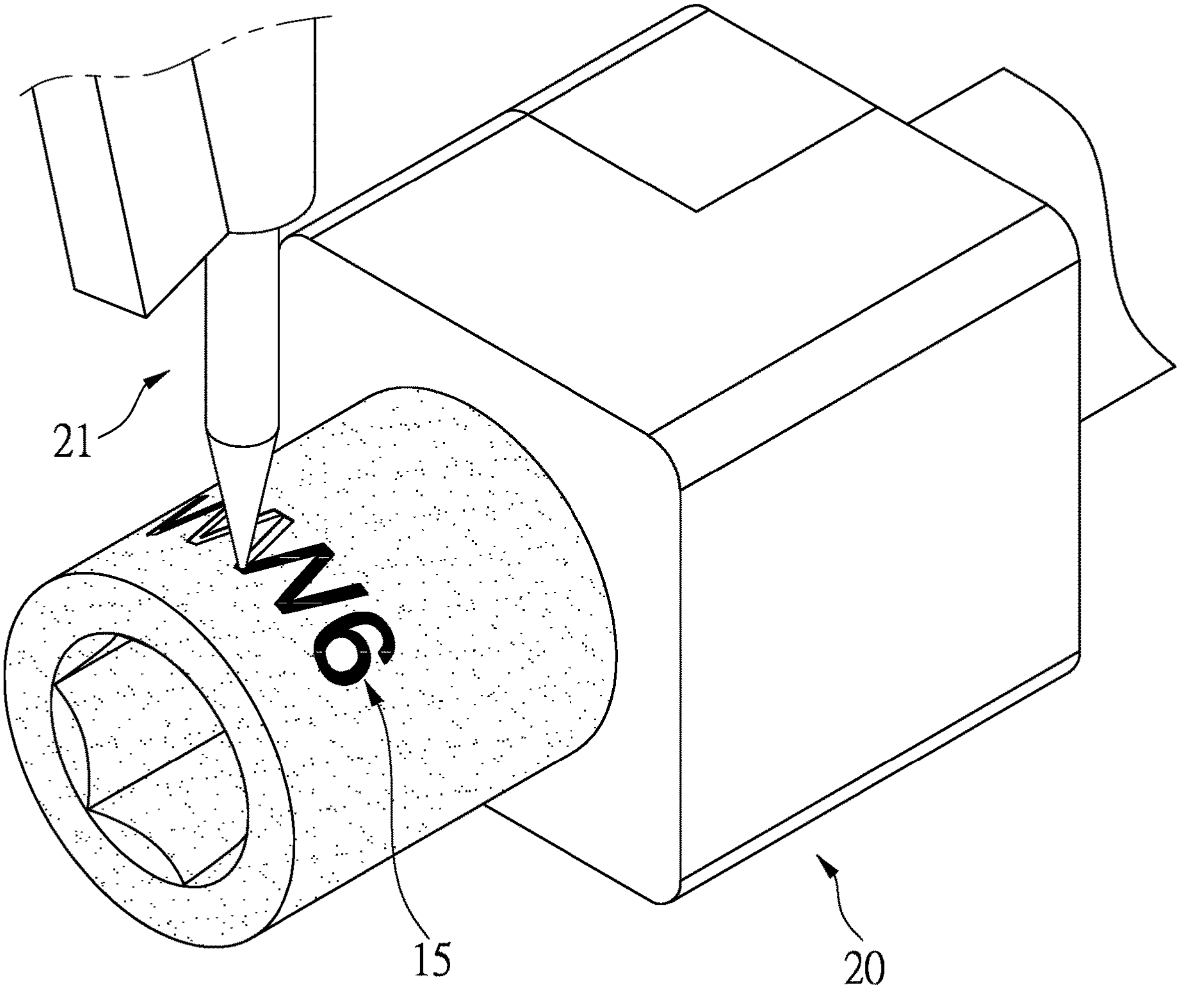
FIG. 5 shows the rough part in the step of coloring of the present invention.
Figure 6:
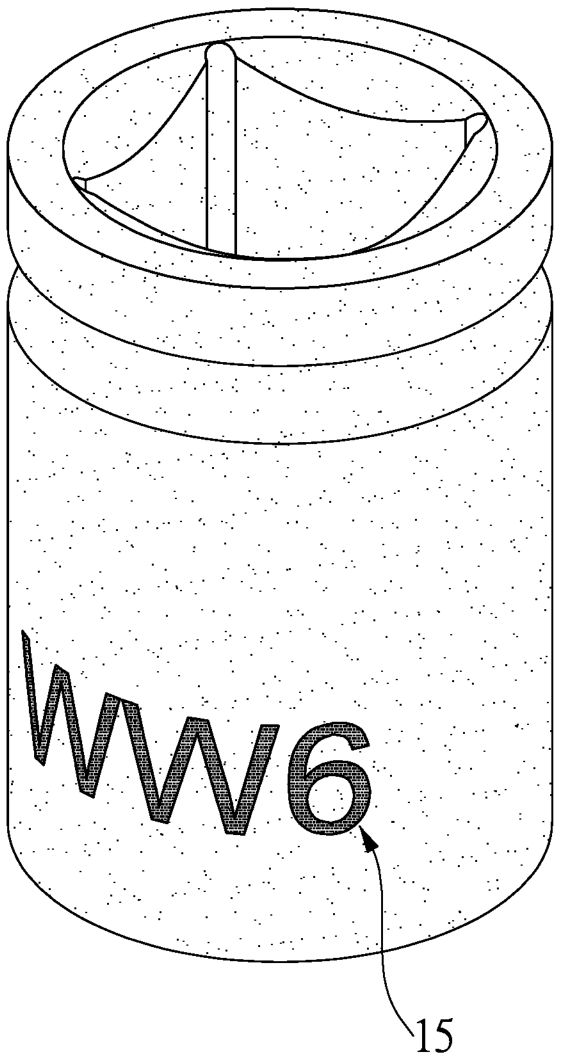
FIG. 6 shows the identifiable hand tool made by the process of the present invention.

Referring to FIGS. 1 to 4, the process of the present invention comprises the following steps:

A machining S1: Using machining tools to produce a rough part 1 of the hand tool. The rough part 1 can be sockets, wretches, screws, nuts or shovels etc., which require identification of specifications and dimensions. The hand tool in this embodiment is taken as an example of a socket.

Setting identification S2: forming an identification area 12 with an identification groove 11 on the surface of the rough part 1 by way of laser engraving or intaglio; Heat treatment S3: proceeding a heat treatment to the rough part 1 with the identification area 12 formed by the identification groove 11 in the step of identification S2 to have a desired hardness to achieve the use purpose of the hand tool; Vibration S4: vibrating the rough part 1 to have a smooth surface; Surface treatment S5: electroplating the rough part 1 to form an electroplating layer 13 on the surface of the rough part 1 to form the hand tool with a base color identification layer 14.

Coloring S6: using a Charged Coupled Device to determine the depth of the identification groove 11 and using a coloring pen 21 of a coloring machine 20 to confirm a positioning path and perform coloring processing to form an identification portion 15 with a different color from the base color identification layer 14.

According to the basic technology described in the present invention, in the manufacturing process, the rough part 1 of the hand tool is formed by forging techniques. Then, the outer surface of the rough part 1 is formed with an identification area 12 with an identification groove 11 by using laser engraving technology. Next, the rough part 1 is subjected to a heat treatment step S3 to achieve the necessary structural hardness for basic use. The rough part 1 is then subjected to vibration processing to form a smooth surface, which is conducive to subsequent electroplating. A base color identification layer 14 is formed, and no relevant tool component positioning procedures are required before these steps, which can eliminate related processes and complexity and may save considerable processing costs. Finally, a coloring step S6 with a CCD (Charged Coupled Device) is used to directly color the identification groove 11 and form an identification portion 15 with a different color from the base color identification layer 14. In this way, the best identification effect can be achieved. Since general hand tools are not single planar shapes but mostly curved shapes, the coloring step S6 with the CCD can match the strength of the corresponding identification groove 11 when coloring to achieve uniform chromaticity.

Through the relevant processing steps of the present invention, the rough part 1 of the hand tool can be smoothly processed without the need for complex back-and-forth processing or repeated vibrations to remove excess material. Even after vibration, for the conventional process, the hand tools in the forming process has multiple and complex procedures, which are easy to cause loss during processing. Even if multiple processing steps are performed, it cannot guarantee that there will be no conflicts between the steps (especially if electroplating and coloring are repeated, the problem of excess material is not easy to solve and will cause difficulties in subsequent processing). The present invention uses a single and simple step schedule to achieve the best marking degree between the identification portion 15 of the identification groove 11 and the base color identification layer 14 after electroplating.

While we have shown and described the embodiment in accordance with the present invention, it should be clear to those skilled in the art that further embodiments may be made without departing from the scope of the present invention.

What is claimed is:

1. A process for producing an identifiable hand tool, comprising the following steps:

using machining tools to produce a rough part of the hand tool;

forming an identification area with an identification groove on a surface of the rough part;

performing a heat treatment to the rough part with the identification area formed by the identification groove in the step of setting identification;

vibrating the rough part;

electroplating the rough part to form an electroplating layer on the surface of the rough part to form a hand tool with a base color identification layer, and using a charged coupled device to determine a depth of the identification groove and using a coloring pen of a coloring machine to confirm a positioning path and perform coloring processing to form an identification portion with a different color from the base color identification layer.

* * * * *